United States Patent

Matsuno et al.

[11] Patent Number: 5,850,616
[45] Date of Patent: Dec. 15, 1998

[54] TRACTION CONTROL SYSTEM FOR FOUR WHEEL DRIVE VEHICLE AND THE METHOD THEREOF

[75] Inventors: Koji Matsuno, Ota; Yutaka Hiwatashi, Isesaki; Akira Takahashi; Munenori Matsuura, both of Ota, all of Japan

[73] Assignee: Fuji Jukogyo Kabushiki Kaisha, Tokyo, Japan

[21] Appl. No.: 709,042

[22] Filed: Sep. 6, 1996

[30] Foreign Application Priority Data

Sep. 28, 1995 [JP] Japan ................................. 7-251575

[51] Int. Cl.⁶ ............................................. B60K 17/348
[52] U.S. Cl. ............................... 701/82; 701/83; 701/84; 701/89; 303/133; 180/197
[58] Field of Search .................................. 701/71, 78, 81, 701/82, 83, 84, 89, 90; 303/133, 113.3, 134, 146; 180/197; 280/91.1

[56] References Cited

U.S. PATENT DOCUMENTS

| 5,555,499 | 9/1996 | Yamashita et al. | 701/82 |
| 5,642,281 | 6/1997 | Ishida et al. | 701/41 |
| 5,742,917 | 4/1998 | Matsuno | 701/69 |

Primary Examiner—Tan Q. Nguyen
Attorney, Agent, or Firm—Beveridge, DeGrandi, Weilacher & Young, LLP

[57] ABSTRACT

A traction control system and method of a four-wheel drive vehicle comprises an engine control apparatus, a brake drive apparatus for automatically and independently applying brake to each of four wheels, wheel speed detecting means, vehicle speed detecting means, steering angle detecting means, yaw rate detecting means, target yaw rate calculating means, yaw rate deviation calculating means, slip amount calculating means for calculating an actual slip amount, reference slip amount storing means for memorizing a reference slip amount, target slip amount determining means for determining a target slip amount based on the reference slip amount, traction control judging means for outputting a traction control signal when a traction control is needed, target braking force calculating means, target engine torque calculating means. When a traction control is needed, the target slip amount determining means determine a target slip amount of a wheel needing the traction control. The target braking force calculating means produce a braking force according to the difference between the target slip amount and the actual slip amount and brake is automatically applied to a wheel requiring the traction control through the brake drive apparatus. At the same time, the target engine torque calculating means produce a signal to the engine control apparatus so as to reduce engine torque.

5 Claims, 7 Drawing Sheets

LEFT TURN CONTROL FOR
REDUCING HEAD TURN MOMENT
(WHEN OVER-STEER TENDENCY
DETECTED)

LEFT TURN CONTROL FOR
INCREASING HEAD TURN MOMENT
(WHEN UNDER-STEER TENDENCY
DETECTED)

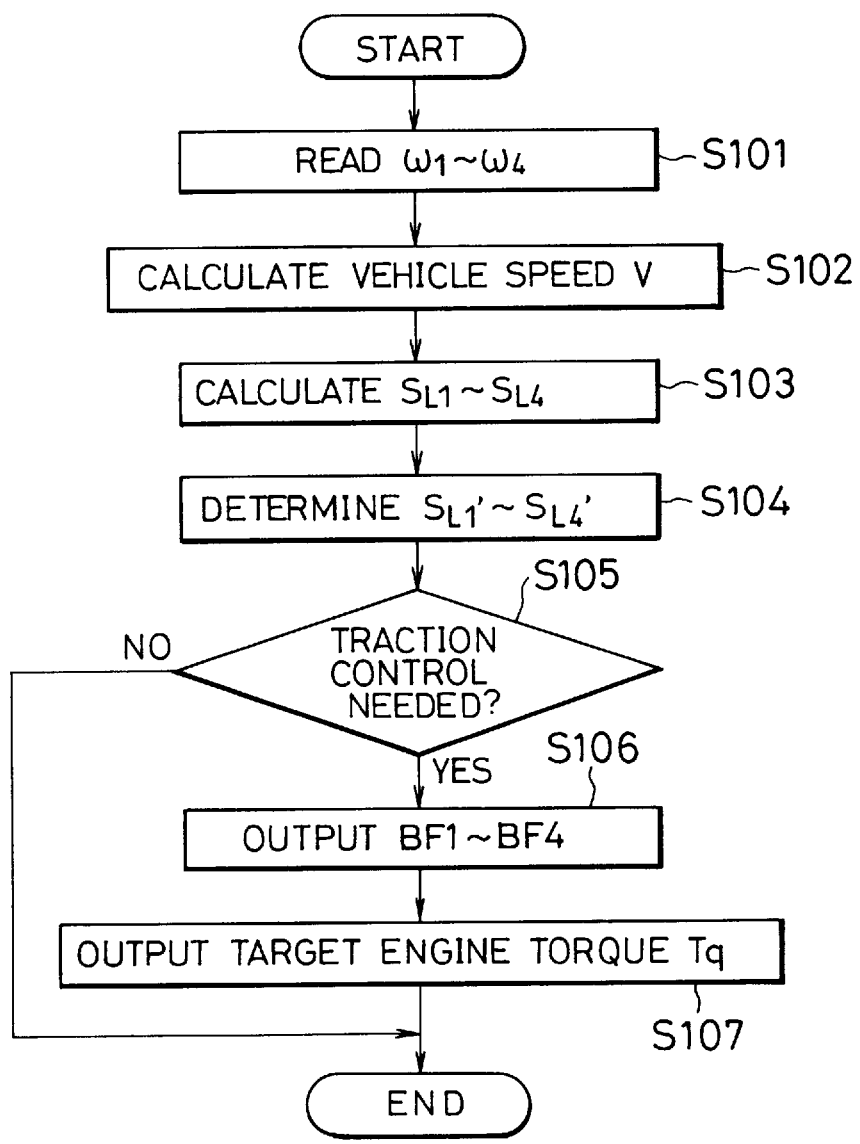

TRACTION CONTROL SYSTEM FOR FOUR WHEEL DRIVE VEHICLE AND THE METHOD THEREOF

BACKGROUND OF THE INVENTION

1. Field of the Invention

The present invention relates to a traction control system and method of a 4-wheel drive vehicle and more particularly to a traction control system and method securing a driving stability by means of independently controlling driving forces of four wheels.

2. Prior Arts

In recent years, due to an increasing concern about vehicle safety, so many techniques for safe driving have been developed. There are several proposed technologies in which when a vehicle turns corners optimally controlled braking force is applied to wheels based on vehicle driving conditions data for accomplishing stable and smooth cornering of the vehicle.

For example, Japanese Unexamined Patent Application Toku-Kai-Hei 2-70561 discloses a braking force control apparatus for controlling braking force on the basis of a yaw rate or an angular velocity of yawing, i.e., a rotational motion about a vertical axis passing through a center of gravity of the vehicle. In this technology, it is judged whether the vehicle is turning in an under-steer condition or in an over-steer condition with respect to a target yaw rate by comparing an actual yaw rate with the target yaw rate and if the vehicle is in under-steer, a braking force is applied to inner wheels (wheels on the side of a turning center) to correct under-steer such that a deviation of the actual yaw rate from the target yaw rate is minimized and if the vehicle is in over-steer, braking force is applied to outer wheels (wheels on the opposite side of a turning center) to correct over-steer.

A traction control introduced onto a four-wheel drive vehicle enables the vehicle to have a good maneuverability on a road with a surface having low friction coefficient and vehicle stability in a marginal zone. Here, it is considered that if the aforementioned braking force control is introduced to a four-wheel drive vehicle incorporating the traction control, the vehicle stability may be further improved.

However, in case of a vehicle having both traction control and braking force control, there are problems such as nullifying the effect or adversely spoiling the traction performance due to a phenomenon, for example, that a wheel under the traction control restores grip when the braking force control is applied to that wheel.

SUMMARY OF THE INVENTION

The present invention is intended to obviate the above-mentioned problems of the prior arts and it is an object of the present invention to provide a traction control system capable of determining a target slip amount for each wheel so as to prevent excessive slips of tire and this results in enhancing a vehicle stability during cornering.

To achieve the object, the present invention comprises: an engine control apparatus for controlling an output torque of an engine, four wheels including front and rear wheels, a wheel cylinder for each of the four wheels, wheel speed detecting means for detecting a wheel speed of each wheel; vehicle speed detecting means for detecting a vehicle speed; steering angle detecting means for detecting a steering angle; and a brake drive apparatus for independently and automatically applying brake pressure to the wheel cylinder, yaw rate detecting means for detecting an actual yaw rate of the vehicle, target yaw rate calculating means for calculating a target yaw rate of the vehicle based on the vehicle speed and the steering angle, yaw rate deviation calculating means for calculating a yaw rate deviation by subtracting the target yaw rate from the actual yaw rate, slip amount calculating means for calculating an actual slip amount for each wheel based on the vehicle speed and the wheel speed, storing means for memorizing a reference slip amount for each of the front and rear wheels respectively, target slip amount determining means for independently determining a target slip amount for each wheel based on the reference slip amount, the vehicle speed, the actual yaw rate and the yaw rate deviation, traction control judging means for judging whether or not a traction control is needed for each wheel based on the comparison of the slip amount with the target slip amount and for outputting a traction control signal so as to execute the traction control if it is judged that any one of the four wheels needs the traction control, target braking force calculating means responsive to the traction control signal for calculating a target brake pressure based on the actual slip amount and the target slip amount and for outputting the target brake pressure to the brake drive apparatus so as to apply the target brake pressure to the wheel cylinder of the wheel needing the traction control, and target engine torque calculating means responsive to the traction control signal for calculating a target engine torque based on the actual slip amount and the target slip amount and for outputting the target engine torque to the engine control apparatus so as to reduce the output torque of the engine.

BRIEF DESCRIPTION OF THE DRAWINGS

FIG. 6 is a flowchart showing a traction control according to an embodiment of the present invention.

DETAILED DESCRIPTION OF PREFERRED EMBODIMENTS

Figure 2:
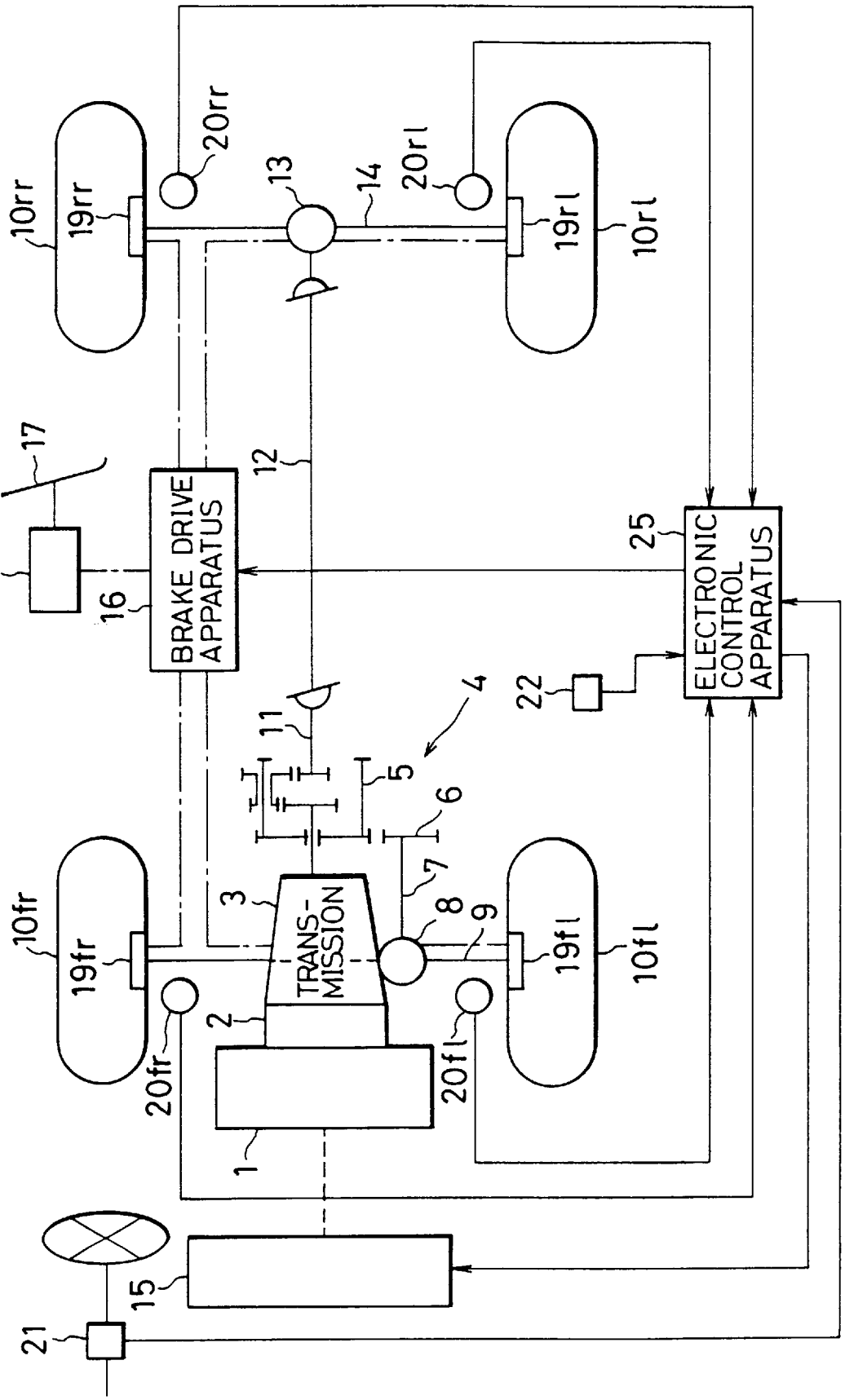
FIG. 2 is a schematic diagram of a traction control system according to an embodiment of the present invention.

Referring now to FIG. 2, numeral 1 denotes an engine to which a center differential 4 is connected through a clutch 2 and a transmission 3. The center differential 4 has a complex planetary gear set capable of selectively distributing torque equally or unequally. A pinion shaft 5 of the center differential 4 is connected with a left front wheel 10fl and a right front wheel 10fr through a reduction gear 6, a front drive shaft 7, a front differential 8 and a front axle 9 and its output shaft 11 is connected with a left rear wheel 10rl and a right rear wheel 10rr through a propeller shaft 12, a rear differential 13 and a rear axle 14 so as to enable a four-wheel drive.

The engine 1 is controlled by an engine control apparatus 15 which performs a fuel injection control, a throttle control, an ignition timing control, a cylinder suspending control, a charge pressure control and other controls. This engine control apparatus also controls the engine 1 so as to increase or decrease its output.

On the other hand, numeral 16 denotes a brake drive apparatus to which a brake pedal 17 operated by a vehicle driver and a master cylinder 18 are connected. When the vehicle driver depresses the brake pedal 17, brake pressure is supplied from the master cylinder 18 to each of wheel cylinders, $19_{fl}$ for a left front wheel, $19_{fr}$ for a right front wheel, $19_{rl}$ for a left rear wheel and $19_{rr}$ for a right rear wheel through the brake drive apparatus 16 to apply brakes to four wheels, a left front wheel $10_{fl}$, a right front wheel $10_{fr}$, a left rear wheel $10_{rl}$ and a right rear wheel $10_{rr}$.

The brake drive apparatus 16 is a hydraulic unit comprising a pressure source, pressure reducing valves, pressure increasing valves and the like for feeding brake pressure independently to each wheel cylinder, $19_{fl}$, $19_{fr}$, $19_{rl}$ and $19_{rr}$, according to input signals.

The wheel speeds $\omega_1$, $\omega_2$, $\omega_3$ and $\omega_4$ of four wheels are detected independently for each of four wheels $10_{fl}$, $10_{fr}$, $10_{rl}$, $10_{rr}$ respectively by wheel speed sensors, $20_{fl}$ for the left front wheel, $20_{fr}$ for the right front wheel, $20_{rl}$ for the left rear wheel and $20_{rr}$ for the right rear wheel. Further, a steering wheel angle sensor 21 is disposed at the steering wheel section to detect the rotational angle $\theta$ of the steering wheel.

Further, numeral 25 denotes an electronic control apparatus composed of a micro-computer and its peripheral circuits, to which the wheel speed sensors $20_{fl}$, $20_{fr}$, $20_{rl}$ and $20_{rr}$, the steering wheel angle sensor 21 and a yaw rate sensor 22 composed of acceleration sensors for detecting an actual yaw rate and from which a drive signal is outputted to the brake drive apparatus 16. The signal from the yaw rate sensor 22 is inputted to the electronic control apparatus 25 through a low-pass filter of 7 Hz, for example.

Figure 1:
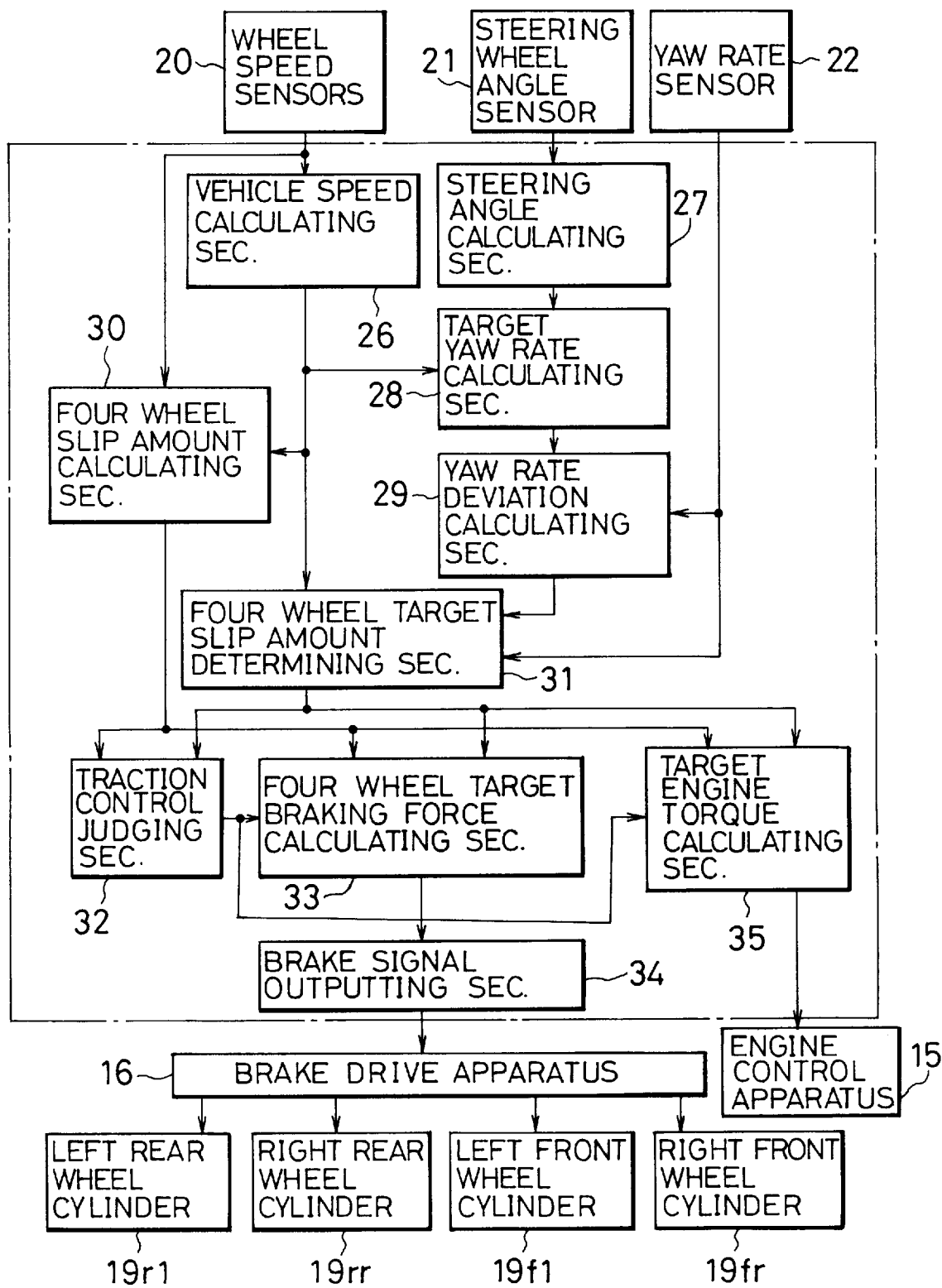
FIG. 1 is a functional block diagram of a traction control system according to an embodiment of the present invention.

As shown in FIG. 1, the electronic control apparatus 25 comprises a vehicle speed calculating section 26, a steering angle calculating section 27, a target yaw rate calculating section 28, a yaw rate deviation calculating section 29, a four wheel slip amount calculating section 30, a four wheel target slip amount determining section 31, a traction control judging section 32, a four wheel target braking force calculating section 33, a brake signal outputting section 34 and a target engine torque calculating section 35.

The vehicle speed calculating section 26 obtains a vehicle speed V by calculating based on wheel speeds $\omega 1$, $\omega 2$, $\omega 3$, $\omega 4$ derived from the wheel speed sensors 20fl, 20fr, 20rl, 20rr respectively according to a predetermined formula (for example averaging speed signals from the wheel speed sensors $20_{fl}$, $20_{fr}$, $20_{rl}$ and $20_{rr}$) and outputs the calculated vehicle speed V to the target yaw rate calculating section 28, the four wheel slip amount calculating section 30 and the four wheel target slip amount determining section 31.

Further, the steering angle calculating section 27 calculates an actual steering angle $\delta f$ ($=\theta/N$) by dividing a steering angle $\theta$ derived from the steering angle sensor 21 by a steering gear ratio N and outputs the actual steering angle $\delta f$ to the target yaw rate calculating section 28.

The target yaw rate calculating section 28 calculates a target yaw rate $\gamma'$ based on the vehicle speed V derived from the vehicle speed calculating section 26, the actual steering angle $\delta f$ derived from the steering angle calculating section 27, taking a delay of response of the system into consideration.

The target yaw rate $\gamma'$ is calculated according to the following formula:

$$\gamma'=[1/(1+T\cdot s)]\cdot G_{\gamma\delta f}(0)\cdot \delta f \tag{1}$$

where T is a time constant; s is a Laplacean. $G_{\gamma\delta f}(0)$ is a value of yaw rate (yaw rate gain) with respect to an actual steering angle $\delta f$ when the vehicle turns around a fixed circle. The target yaw rate gain $G_{\gamma\delta f}$ is calculated according to the following formula:

$$G_{\gamma\delta f}(0)=1/(1+A_0\cdot V^2)\cdot V/L \tag{2}$$

where L is a wheelbase of the vehicle; $A_0$ is a stability factor determined by vehicle specifications. Further, the stability factor $A_0$ is obtained according to the following formula:

$$A_0=[-m\cdot(L_f\cdot CP_f-L_r\cdot CP_r)]/(2\cdot L^2\cdot CP_f\cdot CP_r) \tag{3}$$

where m is a vehicle weight; $L_f$ is a distance between a front axle and a center of gravity; $L_r$ is a distance between a rear axle and a center of gravity; $CP_f$ is a front equivalent cornering power; $CP_r$ is a rear equivalent cornering power. Further, the above formula (1) is an expression in which a delay of response of the vehicle expressed in the second order is approximated to the one expressed in the first order and the time constant T is obtained from the following formula:

$$T=m\cdot L_f\cdot V/2\cdot L\cdot CP_r \tag{4}$$

The yaw rate deviation calculating section 29 calculates a yaw rate deviation $\Delta\gamma$ ($=\gamma-\gamma'$) by subtracting the target yaw rate $\gamma'$ outputted from the target yaw rate calculating section 28 from the actual yaw rate $\gamma$ detected by the yaw rate sensor 22 and outputs this yaw rate deviation $\Delta\gamma$ to the four wheel target slip amount determining section 31.

The four wheel slip amount calculating section 30 calculates an actual slip amount of a wheel (a slip amount $S_{f1}$ for the left front wheel, a slip amount $S_{f2}$ for the right front wheel, a slip amount $S_{f3}$ for the left rear wheel and a slip amount $S_{f4}$ for the right rear wheel) based on the wheel speed $\omega_1$, $\omega_2$, $\omega_3$ and $\omega_4$ derived from the wheel speed sensor 20 ($20_{fl}$, $20_{fr}$, $20_{rl}$ and $20_{rr}$) and the vehicle speed V and outputs the actual slip amount to the traction control judging section 32, the four wheel target braking force calculating section 33 and the target engine torque calculating section 35. The slip amount ($S_{f1}$, $S_{f2}$, $S_{f3}$ and $S_{f4}$) is obtained by subtracting the vehicle speed V from the wheel speed ($\omega_1$, $\omega_2$, $\omega_3$ and $\omega_4$).

$$S_{f1}=\omega_1-V \tag{5}$$

$$S_{f2}=\omega_2-V \tag{6}$$

$$S^{f3}=\omega_3-V \tag{7}$$

$$S_{f4}=\omega_4-V \tag{8}$$

The four wheel target slip amount determining section 31 determines based on the vehicle speed V by referring to target slip amount maps which will be described hereinafter a necessary target slip amount for each of four wheels ($S_{f1}'$ for the left front wheel, $S_{f2}'$ for the right front wheel, $S_{f3}'$ for the left rear wheel and $S_{f4}'$ for the right rear wheel) independently and outputs the target slip amount to the traction control judging section 32, the four wheel target braking force calculating section 33 and the target engine torque calculating section 35.

Figure 5A:
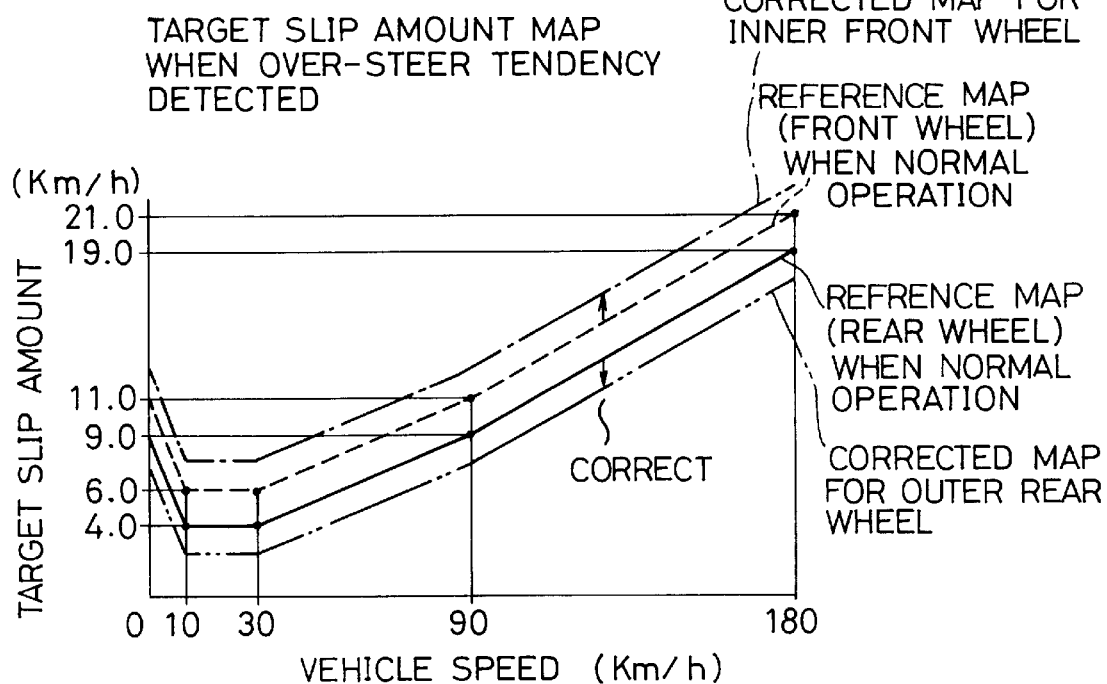
FIGS. 5a and 5b are drawings showing an example of a map for determining a target slip amount according to an embodiment of the present invention.
Figure 5B:
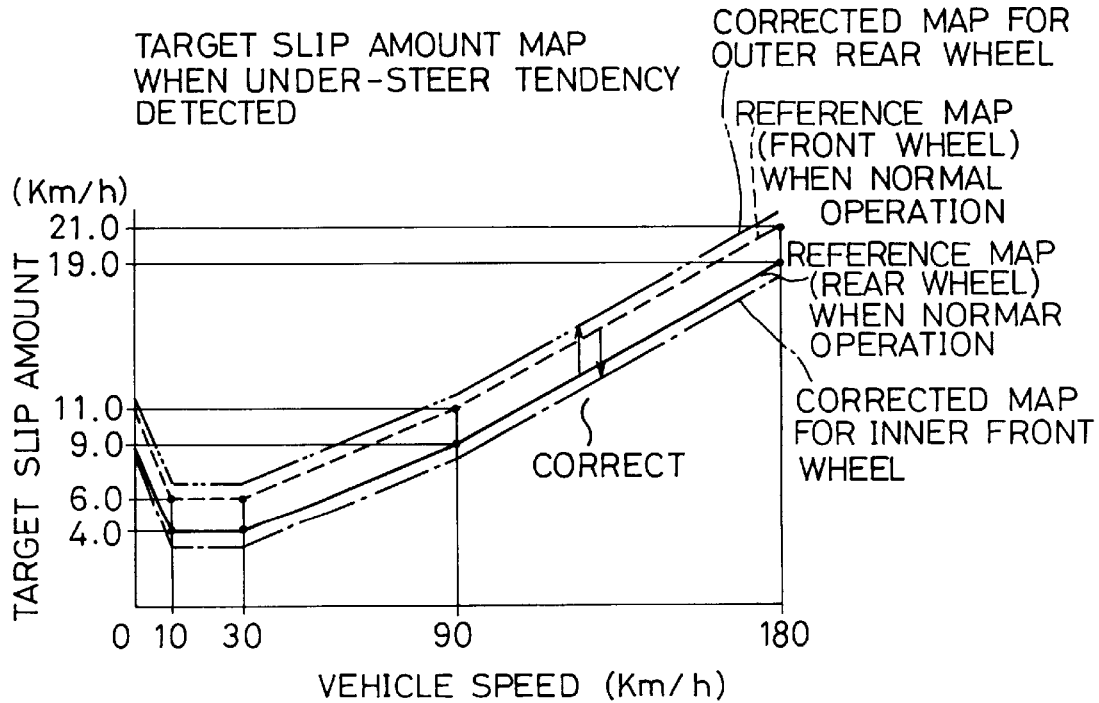

The target slip amount is determined by referring to a map shown in FIG. 5a or FIG. 5b according to the vehicle running condition. First, a reference slip amount is plotted as a function of the vehicle speed with respect to the vehicle being operated roughly in a straight running condition or turning in a roughly neutral steer condition. The reference slip amount is established for each of front and rear wheels. When the target slip amount is read from the map, the above reference slip amount is corrected according to an process described hereinafter and this corrected reference slip amount provides a target slip amount when the traction control is carried out.

When the vehicle turns with a small turning circle at very low speeds, the wheel speeds ω1, ω2, ω3, ω4 may make a relatively large difference. Further, in this condition, an output of the magnetic pick-up of the wheel speed sensor 20 (20$_{fl}$, 20$_{fr}$, 20$_{rl}$ and 20$_{rr}$) may be low in voltage. Under these conditions, it is desirable to determine the target slip amounts on the large side, taking an adverse effect on precision into consideration. Further, the target slip amount is established such that it has a constant small value at low speeds and subsequently it becomes large as the vehicle speed V increases at intermediate and higher speeds.

Further, in order to enhance a stability against-spin of the vehicle during the traction control, the target slip amounts of rear wheels $S_{t3}'$, $S_{t4}'$ (drawn in a solid line) are determined so as to be lower than those of front wheels $S_{t1}'$, $S_{t2}'$ (drawn in a broken line).

The reference slip amounts are corrected based on the actual yaw rate γ and the yaw rate deviation Δγ according to the program described as follows.

Figure 3A:
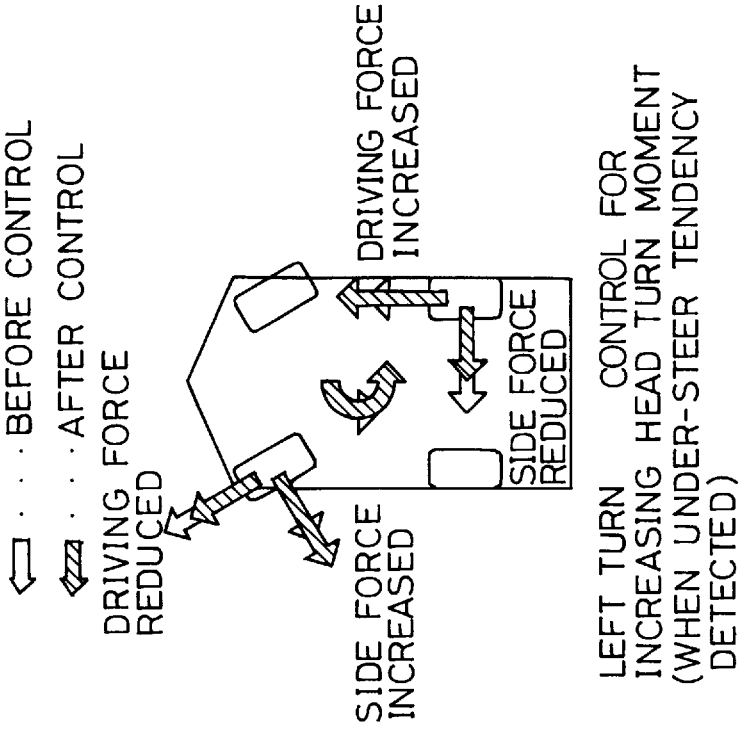
FIGS. 3a and 3b are drawings for explaining how to control a head turn moment according to an embodiment of the present invention.
Figure 3B:
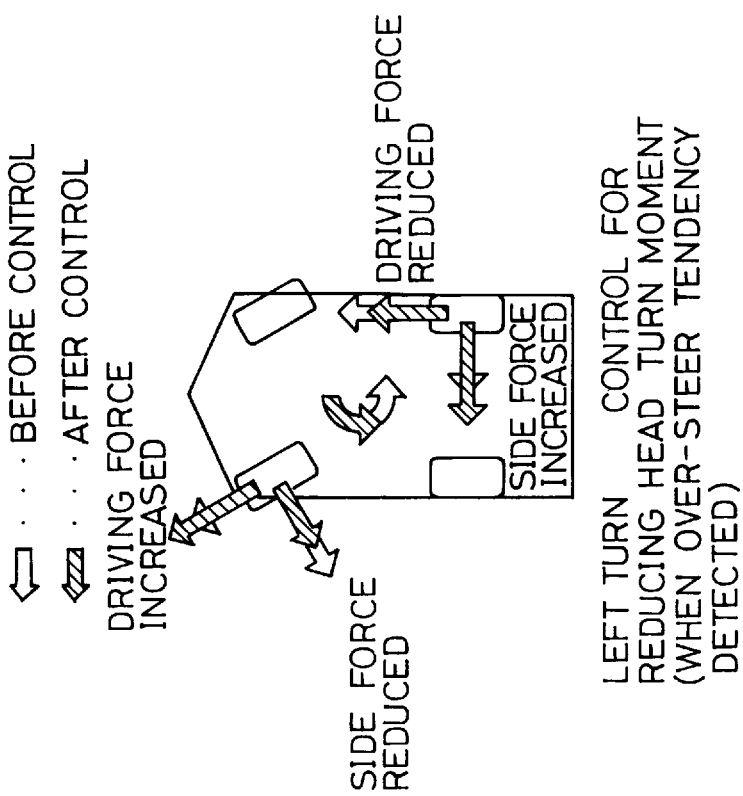

As shown in FIG. 3a, when it is detected that the vehicle makes a left turn and is in an over-steer tendency, the head turn moment can be reduced by increasing the driving force of the left front wheel for reducing the side force thereof and by decreasing the driving force of the right rear wheel for increasing the side force thereof. That is, in the map of the target slip amount, this can be accomplished by correcting the slip amount of the left front wheel to the higher side and the slip amount of the right rear wheel to the lower side. Further, as shown in FIG. 3b, when it is detected that the vehicle makes a left turn and is in an under-steer tendency, the head turn moment can be increased by decreasing the driving force of the left front wheel for increasing the side force thereof and by increasing the driving force of the right rear wheel for reducing the side force thereof. That is, this can be accomplished by correcting the slip amount of the left front wheel to the lower side and the slip amount of the right rear wheel to the higher side.

Figure 4:
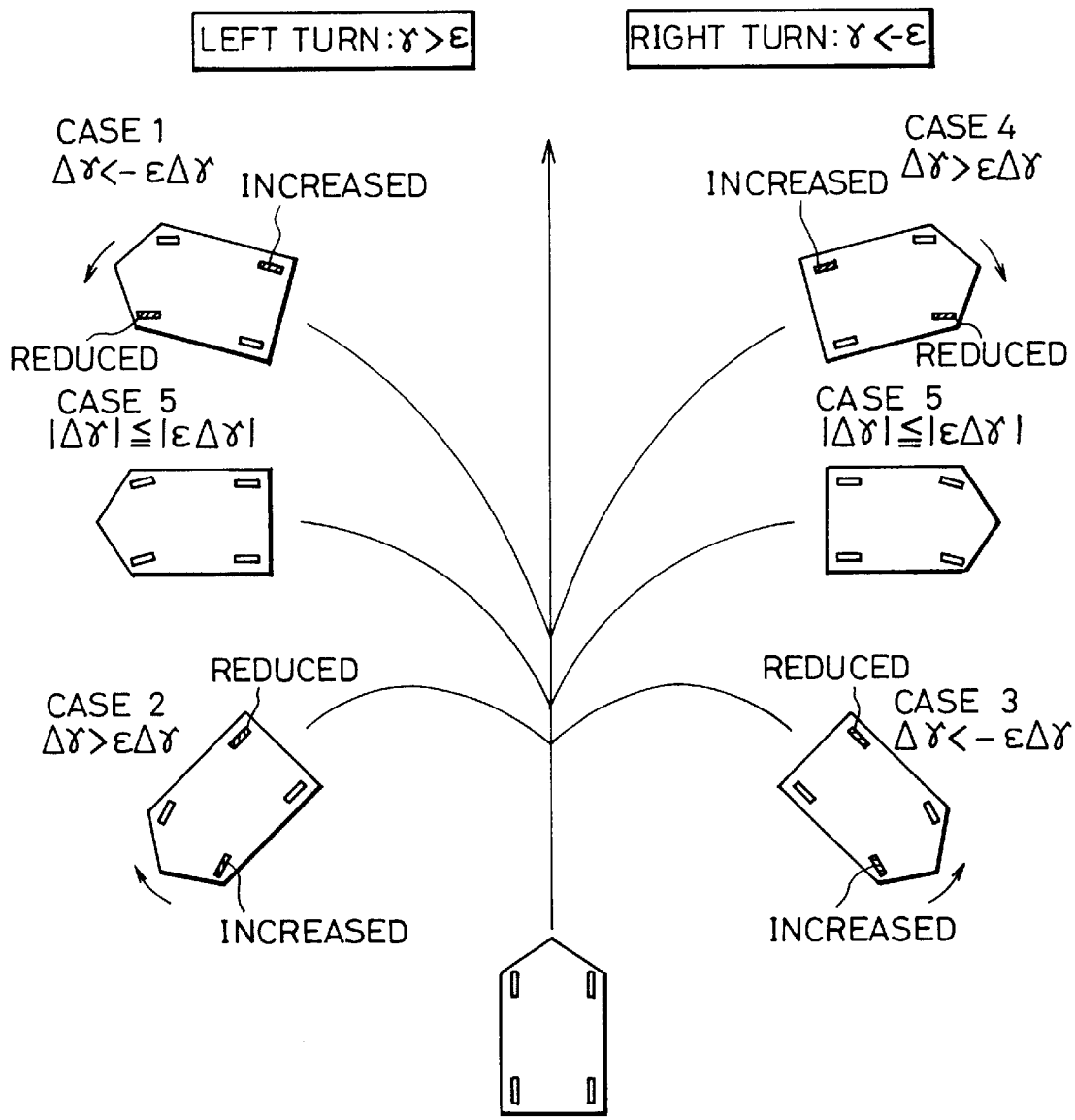
FIG. 4 is a drawing showing an operation of a vehicle under the traction control according to an embodiment of the present invention.

The corrections of the map of the target slip amount have following five selections (refer to FIG. 4). Signs of the yaw rate c and the target yaw rate c' are both assigned to plus (+) with respect to a left turn and to minus (-) with respect to a right turn.

Case 1. The target slip amount of the left front wheel is reduced like moving from broken line to one-dot chain line in FIG. 5b and the target slip amount of the right rear wheel is increased like moving from solid line to two-dot chain line in FIG. 5b, when γ>ε and Δγ<-εΔγ, i.e., the vehicle is turning to the left and is in an under-steer tendency with respect to the target yaw rate γ';

Case 2. The target slip amount of the left front wheel is increased like moving from broken line to one-dot chain line in FIG. 5a and the target slip amount of the right rear wheel is decreased like moving from solid line to two-dot chain line in FIG. 5a, when γ>ε and Δγ>εΔγ, i.e., the vehicle is turning to the left and is in an over-steer tendency with respect to the target yaw rate γ';

Case 3. The target slip amount of the right front wheel is increased like moving from broken line to one-dot chain line in FIG. 5a and the target slip amount of the left rear wheel is reduced like moving from solid line to two-dot chain line in FIG. 5a, when γ<ε and Δγ<-εΔγ, i.e., the vehicle is turning to the right and is in an over-steer tendency with respect to the target yaw rate γ';

Case 4. The target slip amount of the right front wheel is reduced like moving from broken line to one-dot chain line in FIG. 5b and the target slip amount of the right rear wheel is increased like moving from solid line to two-dot chain line in FIG. 5b, when γ<ε and Δγ>εΔγ, i.e., the vehicle is turning to the right and is in an under-steer tendency with respect to the target yaw rate γ'; and Case 5. No correction is made, when |γ|<|ε|, i.e., the vehicle is almost in a straightly running condition or |Δγ|≦|εΔγ|, i.e., the vehicle is in an almost neutral-steer condition; where ε and εΔγ are positive values which are nearly equal to zero and these are predetermined through other means such as experiments or calculations.

Thus, for each case the correction of the target slip amounts is made and then for each wheel the target slip amount ($S_{t1}'$, $S_{t2}'$, $S_{t3}'$ and $S_{t4}'$) is determined independently with reference to the map for the target slip amount determination according to the vehicle speed V.

In this embodiment, the correction of the slip amount is made for both front and rear wheels, however, the correction may be made only for front or rear wheel, if the obtained yaw moment is enough large.

In the traction control judging section 32, the actual slip amounts $S_{t1}$, $S_{t2}$, $S_{t3}$ and $S_{t4}$ inputted thereto from the four wheel slip amount calculating section 30 are compared respectively with the target slip amounts $S_{t1}'$, $S_{t2}'$, $S_{t3}'$ and $S_{t4}'$ inputted thereto from the four wheel target slip amount calculating section 31. If any one of slip amounts exceeds the corresponding target slip amount, the traction control judging section 32 judges a traction control to be performed on the wheel or the wheels exceeding the target slip amount and outputs a traction control signal to the four wheel target braking force calculating section 33 and the target engine torque calculating section 33. Further, if the slip amounts are less than the corresponding target slip amounts, the traction control judging section 32 judges a stop of the traction control so as to stop the traction control when brake pressures for four wheels become zero and the engine output restores a normal operational condition and outputs a stop signal of the traction control to the four wheel target braking force calculating section 33 and the target engine torque calculating section 35.

The four wheel target braking force calculating section 33, when the traction control is applied to the subject wheel or wheels, calculates a target braking force (a target brake pressure) for each wheel, BF1, BF2, BF3 and BF4 according to the difference between the actual slip amount $S_{t1}$, $S_{t2}$, $S_{t3}$, $S_{t4}$ and the target slip amount $S_{t1}'$, $S_{t2}'$, $S_{t3}'$ and $S_{t4}'$ and outputs the target braking force (target brake pressure) to the brake signal outputting section 34.

The brake signal outputting section 34 outputs to the brake drive apparatus 16 a brake signal so as to apply the target brake pressure BFl, BF2, BF3 and BF4 which have been calculated in the four wheel target braking force calculating section 33 to the corresponding wheel.

The target engine torque calculating section 35, when the traction control is applied to the subject wheel or wheels, compares the slip amount with the target slip amount with respect to a wheel having a highest wheel speed among the subject wheels and establishes a target engine torque $T_q$ when the engine output is reduced by the difference of the slip amount and the target slip amount. The established torque $T_q$ is outputted to the engine control section 15.

Next, an operation of the traction control system will be described with reference to a flowchart in FIG. 6.

When the program starts, at a step 101 (hereinafter referred to as S something) the wheel speed $\omega_1$, $\omega_2$, $\omega_3$ and $\omega_4$ is detected by the wheel speed sensor $20_{fl}$, $20_{fr}$, $20_{rl}$ and $20_{rr}$ respectively. Then, the program goes to S102 where the vehicle speed calculating section 26 calculates a vehicle speed V based on the wheel speed $\omega_2$, $\omega_3$ and $\omega_4$. Then, at S103 the four wheel slip amount calculating section 30 obtains an actual slip amount $S_{f1}$, $S_{f2}$, $S_{f3}$, $S_{f4}$ by subtracting the vehicle speed V from the wheel speed $\omega_2$, $\omega_3$, $\omega_4$. After that, the program goes to S104 where the four wheel target slip amount determining section 31 determines a target slip amount $S_{f1}'$, $S_{f2}'$, $S_{f3}'$, $S_{f4}'$ for each wheel based on the vehicle speed V, the yaw rate $\gamma$ and the yaw rate deviation $\Delta\gamma$ by referring to the target slip amount maps and steps to S105.

At S105, the traction control judging section 32 judges whether or not the traction control is needed by comparing the slip amount $S_{f1}$, $S_{f2}$, $S_{f3}$, $S_{f4}$ with the target slip amount $S_{f1}'$, $S_{f2}'$, $S_{f3}'$, $S_{f4}'$. For example, when the four wheels run on a road surface having high friction coefficient and drive forces of four wheels are not higher than necessary, each of four tires has a grip enough to grasp the load surface with a small amount of slip amounts. In such a situation, since the slip amounts $S_{f1}$, $S_{f2}$, $S_{f3}$ and $S_{f4}$ are smaller than the target slip amounts $S_{f1}'$, $S_{f2}'$, $S_{f3}'$ and $S_{f4}'$ respectively, there is no need for traction control and the program goes to an end.

On the other hand, when the vehicle driver presses an accelerator pedal excessively on a road with a surface having high friction coefficient or when the vehicle runs on a road with a surface having low friction coefficient, the wheel slips tend to occur because of the drive force coming close to the limit of friction coefficient of the road surface. In this situation, since any of the slip amounts $S_{f1}$, $S_{f2}$, $S_{f3}$ and $S_{f4}$ exceeds any corresponding one of the target slip amounts $S_{f1}'$, $S_{f2}'$, $S_{f3}'$ and $S_{f4}'$, it is judged that the traction control is needed and the program steps to S106.

At S106, the four wheel target braking force calculating section 33 calculates a difference between the slip amount $S_{f1}$, $S_{f2}$, $S_{f3}$, $S_{f4}$ and the target slip amount $S_{f1}'$, $S_{f2}'$, $S_{f3}'$, $S_{f4}'$ of the wheel needing the traction control and produces a target brake pressure BF1, BF2, BF3, BF4. The target brake pressure is outputted to the brake drive apparatus 16 through the brake signal outputting section 34 so as to apply the target brake pressure BF1, BF2, BF3, BF4.

Further, the program goes to S107 where the target engine torque calculating section 35 compares the slip amount with the target slip amount with respect to the wheel having the highest wheel speed and determines the target engine torque $T_q$ lowered by the difference between the slip amount and the target slip amount. Thus determined target engine torque $T_q$ is outputted to the engine control apparatus 15.

Thus applied brake pressure and thus reduced engine output control the traction of four wheels so as to reduce slip amounts, whereby excessive slips of wheels can be prevented.

When the vehicle driver operates the accelerator pedal so as to lower the engine output, the slip amount is decreased immediately and brake pressures of four wheels drop to zero. At this moment, it is judged that the traction control is not needed and the vehicle returns to a normal four-wheel drive operation.

Figure 7:
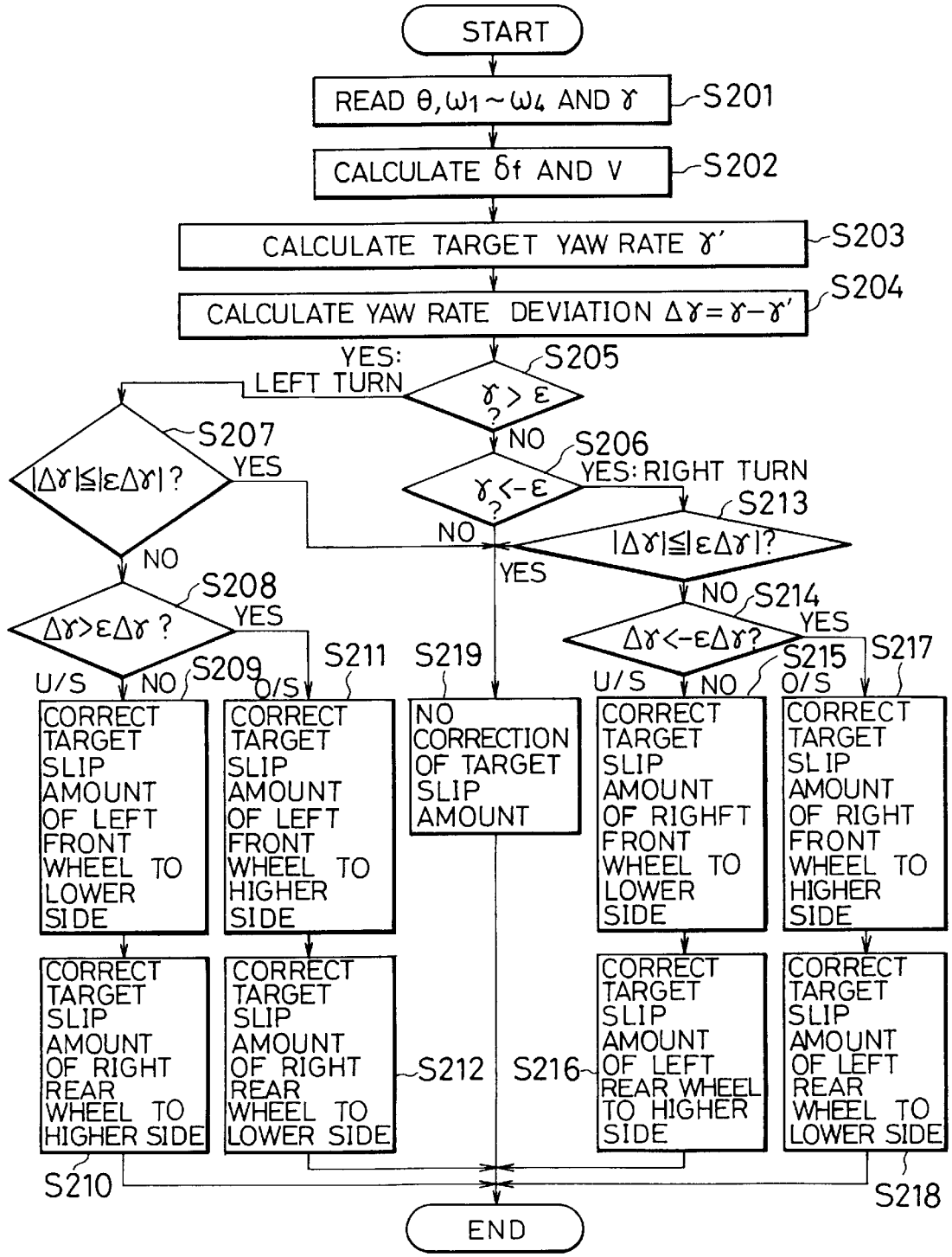
FIG. 7 is a flowchart for determining a target slip amount according to an embodiment of the present invention.

Next, referring to FIG. 7, the program for determining the target slip amount will be described. First, at S201, the steering wheel angle h is read from the steering wheel sensor 21, the wheel speed $\omega_1$, $\omega_2$, $\omega_3$, $\omega_4$ is read from the wheel speed sensor $20_{fl}$, $20_{fr}$, $20_{rl}$, $20_{rr}$ and the actual yaw rate $\gamma$ is read from the yaw rate sensor 22.

Then, the program goes to S202 where the steering angle calculating section 27 calculates the actual steering angle $\delta f$ (=$\theta$/N) from the steering wheel angle $\theta$ and the vehicle speed calculating section 26 calculates the vehicle speed V from the wheel speed $\omega_1$, $\omega_2$, $\omega_3$, $\omega_4$ for each wheel.

Then, the program goes to S203 where the target yaw rate calculating section 28 calculates the target yaw rate $\gamma'$ according to the formula (1) and after that at S204 the yaw rate deviation calculating section 29 calculates the yaw rate deviation $\Delta\gamma$ (=$\gamma-\gamma'$).

Then, the program steps to S205 where it is judged whether or not the actual yaw rate $\gamma$ is larger than $\epsilon$, that is to say, whether or not the vehicle is making a relatively sharp left turn and if the actual yaw rate $\gamma$ is less than $\epsilon$ the program goes to S206 where it is judged whether or not the actual yaw rate $\gamma$ is smaller than $-\epsilon$., that is to say, whether or not the vehicle is making a relatively sharp right turn. If at S206 it is judged to be $\epsilon \geq \gamma \geq -\epsilon$, since it can be judged that the vehicle is making neither a left turn nor a right turn, namely since it can be judged that the vehicle is running roughly in straight, the program skips to S219 where the target slip amount map is not corrected. If at S205 it is judged that $\gamma$ is larger than $\epsilon$ ($\gamma > \epsilon$), the program goes to S207 where it is judged whether or not the yaw rate deviation $\Delta\gamma$ is near zero according to the formula of inequality $|\Delta\gamma| \leq |\epsilon\Delta\gamma|$ to judge whether or not the vehicle is in a roughly neutral steer.

Further, at S207 if $|\Delta\gamma| \leq |\epsilon\Delta\gamma|$, namely, it is judged that the actual yaw rate $\gamma$ is roughly equal to the target yaw rate $\gamma'$ (in a roughly neutral steer), the program steps to S219 and if otherwise (in an under-steer tendency or in an over-steer-tendency), the program goes to S208.

The step S208 is a step where it is judged whether or not the vehicle is either in an under-steer tendency or in an over-steer tendency. At S208 if $\Delta\gamma < -\epsilon\Delta\gamma$ and the sign of the yaw rate deviation $\Delta\gamma$ is negative differently from the sign of the actual yaw rate $\gamma$, it is judged that the vehicle is in an under-steer tendency with respect to the target yaw rate $\gamma'$ and the program steps to S209 and if $\Delta\gamma = \epsilon\Delta\gamma$, the sign of the yaw rate $\Delta\gamma$ is positive similarly to the sign of the actual yaw rate $\gamma$, it is judged that the vehicle is in an over-steer tendency with respect to the target yaw rate $\gamma'$ and the program goes to S211.

When the program goes to S209, the target slip amount of the left front wheel is corrected to the lower side and at S210 the target slip amount of the right rear wheel is corrected to the higher side. Further, when the program goes to S211, the target slip amount of the left front wheel is corrected to the higher side and at S212 the target slip amount of the right rear wheel is corrected to the lower side.

On the other hand, at S206 if it is judged that the yaw rate $\gamma$ is less than $-\epsilon$ ($\gamma < -\epsilon$), that is, if it is judged that the vehicle is making a relatively sharp right turn, the program steps to S213 where it is judged whether or not the yaw rate deviation $\Delta\gamma$ is near zero according to the formula of inequality $|\Delta\gamma| \leq |\epsilon\Delta\gamma|$ and the actual yaw rate $\gamma$ roughly agrees with the target yaw rate $\gamma'$.

At S213, if $|\Delta\gamma| \leq |\epsilon\Delta\gamma|$ and the actual yaw rate $\gamma$ is roughly equal to the target yaw rate $\gamma'$, the program goes to S219 where no correction is made to the target slip amount. If otherwise (either in an under-steer tendency or in an over-steer tendency), the program goes to S214.

The step S214 is a step where it is judged whether the vehicle is in an under-steer tendency or in an over-steer tendency according to $\Delta\gamma > \epsilon\Delta\gamma$ or $\Delta\gamma < -\epsilon\Delta\gamma$. If $\Delta\gamma > \epsilon\Delta\gamma$ and the sign of the yaw rate deviation $\Delta\gamma$ is positive differently from the sign of the actual yaw rate γ, it is judged that the vehicle is in an under-steer tendency with respect to the target yaw rate γ and then the program goes to S215. On the other hand, if Δγ<-εΔγ and the sign of the yaw rate deviation Δγ is negative similarly to the sign of the actual yaw rate γ, it is judged that the vehicle is in an over-steer tendency with respect to the target yaw rate γ' and then the program goes to S217.

When the program goes to S215, the target slip amount of the right front wheel is corrected to the lower side and at S216 the target slip amount of the left rear wheel is corrected to the higher side. Further, when the program goes to S217, the target slip amount of the right front wheel is corrected to the higher side and at S218 the target slip amount of the left rear wheel is corrected to the lower side.

As described above, the target slip amount on the map is corrected according to the turning direction and the steer tendency of the vehicle. When any of the actual slip amounts of the four wheels exceeds the corresponding target slip amount as mentioned above, the traction control is carried out. According to the present invention, whenever it is judged that the traction control is needed, even when the vehicle is running in straight, the traction control including the brake and torque controls is applied to the vehicle.

In summary, according to the present invention, since the target slip amount is determined independently for each of four wheels so as to produce an appropriate yaw moment, the vehicle can be prevented from causing excessive slips and the vehicle stability during cornering can be enhanced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A traction control system of a four-wheel drive vehicle, having an engine, an engine control apparatus for controlling an output torque of said engine, four wheels including front and rear wheels, a wheel cylinder for each of said four wheels, wheel speed detecting means for detecting a wheel speed of said each wheel, vehicle speed detecting means for detecting a vehicle speed, steering angle detecting means for detecting a steering angle, and a brake drive apparatus for independently and automatically applying brake pressure to said wheel cylinder, comprising:

yaw rate detecting means for detecting an actual yaw rate of said vehicle;

target yaw rate calculating means for calculating a target yaw rate of said vehicle based on said vehicle speed and said steering angle;

yaw rate deviation calculating means for calculating a yaw rate deviation by subtracting said target yaw rate from said actual yaw rate;

slip amount calculating means for calculating an actual slip amount for said each wheel based on said vehicle speed and said wheel speed;

storing means for memorizing a reference slip amount for each of said front and rear wheels respectively;

target slip amount determining means for independently determining a target slip amount for said each wheel based on said reference slip amount, said vehicle speed, said actual yaw rate and said yaw rate deviation;

traction control judging means for judging whether or not a traction control is needed for said each wheel based on the comparison of said slip amount with said target slip amount and for outputting a traction control signal so as to execute said traction control if it is judged that any one of said four wheels needs said traction control;

target braking force calculating means responsive to said traction control signal for calculating a target brake pressure based on said actual slip amount and said target slip amount and for outputting said target brake pressure to said brake drive apparatus so as to apply said target brake pressure to said wheel cylinder of said wheel needing said traction control; and target engine torque calculating means responsive to said traction control signal for calculating a target engine torque based on said actual slip amount and said target slip amount and for outputting said target engine torque to said engine control apparatus so as to reduce said output torque of said engine.

2. The traction control system according to claim 1, wherein said target slip amount determining means determine said target slip amount by making at least either a correction of reducing said reference target slip amount of a front wheel on a turning center side or a correction of increasing said target slip amount of a rear wheel on an opposite side of said turning center when said actual yaw rate and said yaw rate deviation have a different sign from each other and determine said target slip amount by making at least either a correction of increasing said reference slip amount of said front wheel on said turning center side or a correction of reducing said target slip amount of said rear wheel on said opposite side of said turning center when said actual yaw rate and said yaw rate deviation have an identical sign to each other.

3. The traction control system according to claim 1, wherein said reference slip amount is a slip amount obtained when said vehicle is operated roughly in a straightly running condition or turns almost in a neutral steer condition.

4. The traction control system according to claim 1, wherein said reference slip amount is predetermined in such a way that it is low at low speeds and becomes high at intermediate or higher speeds as said vehicle speed increases.

5. A traction control method of a four-wheel drive vehicle, having an engine, an engine control apparatus for controlling an output torque of said engine, four wheels including front and rear wheels, a wheel cylinder for each of said four wheels, wheel speed detecting means for detecting a wheel speed of said each wheel, vehicle speed detecting means for detecting a vehicle speed, steering angle detecting means for detecting a steering angle, and a brake drive apparatus for applying brake pressure to said wheel cylinder, comprising the steps of:

detecting an actual yaw rate of said vehicle;

calculating a target yaw rate of said vehicle based on said vehicle speed and said steering angle;

calculating a yaw rate deviation by subtracting said target yaw rate from said actual yaw rate;

calculating an actual slip amount for said each wheel based on said vehicle speed and said wheel speed;

memorizing a reference slip amount for each of said front and rear wheels respectively;

determining a target slip amount for said each wheel based on said reference slip amount, said vehicle speed, said actual yaw rate and said yaw rate deviation;

judging whether or not a traction control is needed for said each wheel based on the comparison of said slip amount with said target slip amount and outputting a traction control signal so as to execute said traction control if it is judged that any one of said four wheels needs said traction control;

responsive to said traction control signal calculating a target brake pressure based on said actual slip amount and said target slip amount and outputting said target brake pressure to said brake drive apparatus so as to apply said target brake pressure to said wheel cylinder of said wheel needing said traction control; and responsive to said traction control signal calculating a target engine torque based on said actual slip amount and said target slip amount and outputting said target engine torque to said engine control apparatus so as to reduce said output torque of said engine.

* * * * *